United States Patent
Sytsma (10) Patent No.: US 11,369,198 B2
(45) Date of Patent: Jun. 28, 2022

(54) SUSPENDED STORAGE SHELF ASSEMBLY (71) Applicant: KNAPE & VOGT MANUFACTURING COMPANY, Grand Rapids, MI (US)

(72) Inventor: Robert S. Sytsma, Rockford, MI (US)

(73) Assignee: KNAPE & VOGT MANUFACTURING COMPANY, Grand Rapids, MI (US)

( * ) Notice: Subject to any disclaimer, the term of this patent is extended or adjusted under 35 U.S.C. 154(b) by 0 days.

(21) Appl. No.: 17/083,688

(22) Filed: Oct. 29, 2020

(65) Prior Publication Data
US 2022/0133038 A1 May 5, 2022

(51) Int. Cl.
*A47B 96/06* (2006.01)
*F16M 13/02* (2006.01)
*A47B 96/02* (2006.01)

(52) U.S. Cl.
CPC ............ *A47B 96/06* (2013.01); *A47B 96/021* (2013.01); *F16M 13/027* (2013.01)

(58) Field of Classification Search
CPC ...... A47B 96/06; A47B 96/021; F16M 13/02; H02G 3/263; H02G 3/0443; Y10T 24/44923
See application file for complete search history.

(56) References Cited

U.S. PATENT DOCUMENTS

| | | |
|---|---|---|
| 276,241 A | 4/1883 | Hanavan |
| 1,566,551 A | 12/1925 | Ghrand |
| 2,458,332 A | 1/1949 | Boschan |
| 2,549,242 A | 4/1951 | Ross |
| 3,139,045 A | 6/1964 | Rojakovick |
| 3,735,951 A | 5/1973 | Reed |
| 3,788,209 A * | 1/1974 | Artar ..................... A47J 43/18 99/349 |
| 3,938,666 A | 2/1976 | Castleberry |
| 3,945,462 A | 3/1976 | Griswold |
| 4,061,092 A | 12/1977 | Jacobsen et al. |
| 4,157,070 A | 6/1979 | Huempfner et al. |
| 4,167,908 A | 9/1979 | Jones et al. |

(Continued)

FOREIGN PATENT DOCUMENTS

| | | |
|---|---|---|
| DE | 10028876 | 7/2001 |
| EP | 206994 | 12/1986 |

(Continued)

*Primary Examiner* — Ko H Chan
(74) *Attorney, Agent, or Firm* — Price Heneveld LLP (57) ABSTRACT

A storage shelf assembly for suspending from a structure includes a platform. A platform support frame includes a first side member that defines a first channel and a second side member that defines a second channel positioned opposite the first side member. A plurality of cross members extend between the first and second side members and are received within the first and second channels. The plurality of cross members are configured to support the platform. A plurality of uprights configured to suspend the platform support frame from the structure are coupled to the platform support frame by an attachment assembly. The attachment assembly includes a support bracket coupled to the upright and configured to cradle the first side member, and a clamp feature coupled to the support bracket and configured to extend over the first side member.

10 Claims, 7 Drawing Sheets

(56) References Cited

U.S. PATENT DOCUMENTS

| | | | |
|---|---|---|---|
| 4,231,300 A * | 11/1980 | Shepard | A47B 96/06 108/192 |
| 4,289,392 A | 9/1981 | Kobori et al. | |
| 4,319,724 A * | 3/1982 | Bradbury | H02G 3/0456 248/49 |
| 4,374,498 A | 2/1983 | Yellin | |
| 4,441,583 A | 4/1984 | Vaught | |
| 4,582,001 A | 4/1986 | Leikarts | |
| 4,656,952 A | 4/1987 | Schweizer | |
| 4,729,483 A | 3/1988 | Schrader | |
| 5,011,239 A | 4/1991 | Guerin | |
| 5,056,878 A | 10/1991 | Givens | |
| 5,199,843 A | 4/1993 | Sferra | |
| 5,203,619 A | 4/1993 | Welsch et al. | |
| 5,215,366 A | 6/1993 | Givens | |
| 5,242,219 A | 9/1993 | Tomaka | |
| 5,379,564 A | 1/1995 | Wynne | |
| 5,542,530 A | 8/1996 | Freelander | |
| 5,601,038 A | 2/1997 | Welch et al. | |
| 5,695,079 A | 12/1997 | Peay | |
| 5,727,700 A | 3/1998 | Digney | |
| 5,884,567 A | 3/1999 | Bartz, Jr. | |
| D416,152 S | 11/1999 | Payne et al. | |
| 6,016,928 A | 1/2000 | Cothran et al. | |
| 6,079,575 A | 6/2000 | Wang | |
| 6,145,678 A | 11/2000 | Morrison | |
| 6,161,709 A | 12/2000 | Kluge et al. | |
| 6,241,106 B1 | 6/2001 | Fujita et al. | |
| 6,286,691 B1 | 9/2001 | Oberhaus et al. | |
| 6,299,001 B1 | 10/2001 | Frolov et al. | |
| 6,311,626 B1 | 11/2001 | Roberts | |
| 6,318,570 B1 | 11/2001 | Mueller et al. | |
| 6,409,031 B1 | 6/2002 | Wynne | |
| D459,926 S | 7/2002 | Mikich et al. | |
| 6,435,105 B1 | 8/2002 | Mikich et al. | |
| 6,460,710 B1 | 10/2002 | Dardashti | |
| D470,353 S | 12/2003 | Mikich et al. | |
| 6,715,427 B2 | 4/2004 | Mikich et al. | |
| 7,152,535 B2 | 12/2006 | Mikich et al. | |
| 7,543,538 B2 * | 6/2009 | Baez | A47B 96/00 108/149 |
| 7,810,438 B2 * | 10/2010 | Ryberg | A47B 96/024 108/42 |
| 8,066,131 B2 * | 11/2011 | Mansor | D06F 57/125 211/117 |
| D653,064 S * | 1/2012 | Lutt | D6/513 |
| 8,245,651 B1 * | 8/2012 | Mikich | A47F 5/01 108/42 |
| 8,511,486 B2 * | 8/2013 | Mansor | A47B 43/003 211/117 |
| 8,657,130 B2 * | 2/2014 | Thrush | A47F 5/08 211/117 |
| 8,827,232 B2 * | 9/2014 | Crowley | A47B 43/003 248/670 |
| 8,985,350 B2 * | 3/2015 | Thrush | A47F 5/0892 211/117 |
| D756,145 S * | 5/2016 | Davis | D6/513 |
| 9,420,884 B2 * | 8/2016 | Newman | F16M 13/027 |
| 9,629,455 B2 * | 4/2017 | Shah | A47F 5/0892 |
| 10,320,164 B2 * | 6/2019 | Garcia | H02G 3/0456 |
| 10,806,257 B1 * | 10/2020 | Liu | A47B 47/024 |
| 10,897,992 B2 * | 1/2021 | Vandenham | A47B 43/006 |
| 10,968,039 B2 * | 4/2021 | Duppong | A47B 55/02 |
| 2002/0023888 A1 | 2/2002 | Wynne et al. | |
| 2015/0060374 A1 * | 3/2015 | Mansor | A47B 43/003 211/2 |

FOREIGN PATENT DOCUMENTS

| | | |
|---|---|---|
| FR | 7224575 | 2/1974 |
| FR | 2526648 | 11/1983 |
| GB | 222248 | 10/1924 |
| GB | 1045379 | 10/1966 |
| JP | H04339760 | 11/1992 |
| JP | H08168416 | 7/1996 |
| JP | H8254039 | 10/1996 |
| JP | 10179299 | 7/1998 |
| WO | 9116837 | 11/1991 |

\* cited by examiner

SUSPENDED STORAGE SHELF ASSEMBLY

BACKGROUND OF THE INVENTION

The present invention relates to a suspended storage shelf assembly. In particular, the present invention relates to a suspended storage shelf assembly that is structurally sound when assembled and able to be packaged efficiently when unassembled.

SUMMARY OF THE INVENTION

One aspect of the present invention is a storage shelf assembly for suspending from a structure. The storage shelf assembly includes a platform comprising at least one panel. The storage shelf assembly also includes a platform support frame including a first side member having an upper wall, a lower wall opposite the upper wall, and a connecting wall extending between the upper and lower walls to define a first channel. The platform support frame also includes a second side member having an upper wall, a lower wall opposite the upper wall, and a connecting wall extending between the upper and lower walls to define a second channel. The second side member is positioned opposite the first side member, such that the second channel generally faces the first channel. The platform support frame further includes a plurality of cross members that extend between the first and second side members and are received within the first and second channels. The at least one panel is configured to be supported by the plurality of cross members. The storage shelf assembly further includes a plurality of uprights coupled to the platform support frame and the structure and configured to suspend the platform support frame from the structure. At least one of the plurality of uprights is coupled to the first side member of the platform support frame via an attachment assembly. The attachment assembly includes a support bracket that is coupled to the at least one upright and is configured to cradle the lower wall of the first side member. The attachment assembly also includes a clamp feature that is coupled to the support bracket opposite the at least one upright, such that the support bracket is positioned between the clamp feature and the at least one upright. The clamp feature extends from the support bracket over the upper wall of the first side member.

Another aspect of the present invention is a storage shelf assembly for suspending from a structure. The storage shelf assembly includes a platform comprising at least one panel. The storage shelf assembly also includes a platform support frame configured to support the at least one panel. The platform support frame includes a first side member having an upper wall, a lower wall opposite the upper wall, and a connecting wall extending between the upper and lower walls to define a first channel. The platform support frame also includes a second side member having an upper wall, a lower wall opposite the upper wall, and a connecting wall extending between the upper and lower walls to define a second channel. The second side member is positioned opposite the first side member, such that the second channel generally faces the first channel. The platform support frame further includes a plurality of cross members that extend between the first and second side members and are received within the first and second channels. At least one of the plurality of cross members includes a first rail. The first rail includes a bottom wall, a top wall opposite the bottom wall, a first side wall extending between the top and bottom walls, and a second side wall extending between the top and bottom walls opposite the first side wall. The first and second side walls are generally parallel to each other and extend from the top wall to the bottom wall about a first distance. The top and bottom walls are generally perpendicular to the first and second side walls and extend from the first side wall to the second side wall about a second distance that is lesser than the first distance. The first rail is received within the first channel defined by the first side member, such that the top wall is generally parallel to the upper wall and the bottom wall is generally parallel to the lower wall. The storage shelf assembly further includes a plurality of uprights that extend between the platform support frame and the structure.

Another aspect of the present invention is a storage shelf assembly for suspending from a structure. The storage shelf assembly includes a platform support frame. The platform support frame includes a first side member having an upper wall, a lower wall opposite the upper wall, and a connecting wall extending between the upper and lower walls to define a first channel. The platform support frame also includes a second side member having an upper wall, a lower wall opposite the upper wall, and a connecting wall extending between the upper and lower walls to define a second channel. The second side member is positioned opposite the first side member, such that the second channel generally faces the first channel. The platform support frame further includes a plurality of cross members that extend between the first and second side members and are received within the first and second channels. The storage shelf assembly also includes a platform configured to be supported by the platform support frame and comprising a plurality of panels. At least one of the plurality of panels extends in a lengthwise direction generally parallel to the first and second side members a first distance, and extends in a widthwise direction generally parallel to at least one the plurality of cross members a second distance. The first distance is greater than the second distance. The shelf support assembly further includes a plurality of uprights that extend between the platform support frame and the structure. The plurality of uprights are configured to suspend the platform support frame from the structure.

These and other advantages of the invention will be further understood and appreciated by those skilled in the art by reference to the following written description, claims, and dependent drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7B, a storage shelf assembly 10 is configured to be suspended from a structure 12. The storage shelf assembly 10 includes a platform 14. The platform 14 includes at least one panel 16. A platform support frame 18 supports the platform 14. The platform support frame 18 includes a first side member 20A having an upper wall 22, a lower wall 24 opposite the upper wall 22, and a connecting wall 26 that extends between the upper and lower walls 22, 24 to define a first channel 28A. A second side member 20B includes an upper wall 22, a lower wall 24 that is opposite the upper wall 22, and a connecting wall 26 that extends between the upper and lower walls 22, 24 to define a second channel 28B. The second side member 20B is positioned opposite the first side member 20A, such that the second channel 28B generally faces the first channel 28A. A plurality of cross members 30 extend between the first and second side members 20A, 20B and are received within the first and second channels 28A, 28B. The at least one panel 16 of the platform 14 is configured to be supported by the plurality of cross members 30. A plurality of uprights 32 are coupled to the platform support frame 18 and to the structure 12. The plurality of uprights 32 are configured to suspend the platform support frame 18 from the structure 12. At least one of the plurality of uprights 32 is coupled to the first side member 20A of the platform support frame 18 via an attachment assembly 34. The attachment assembly 34 includes a support bracket 36 and a clamp feature 38. The support bracket 36 is coupled to the at least one upright 32 and is configured to cradle the lower wall 24 of the first side member 20A. The clamp feature 38 is coupled to the support bracket 36 opposite the at least one upright 32, such that the support bracket 36 is positioned between the clamp feature 38 and the at least one upright 32. The clamp feature 38 extends from the support bracket 36 over the upper wall 22 of the first side member 20A.

Figure 1:
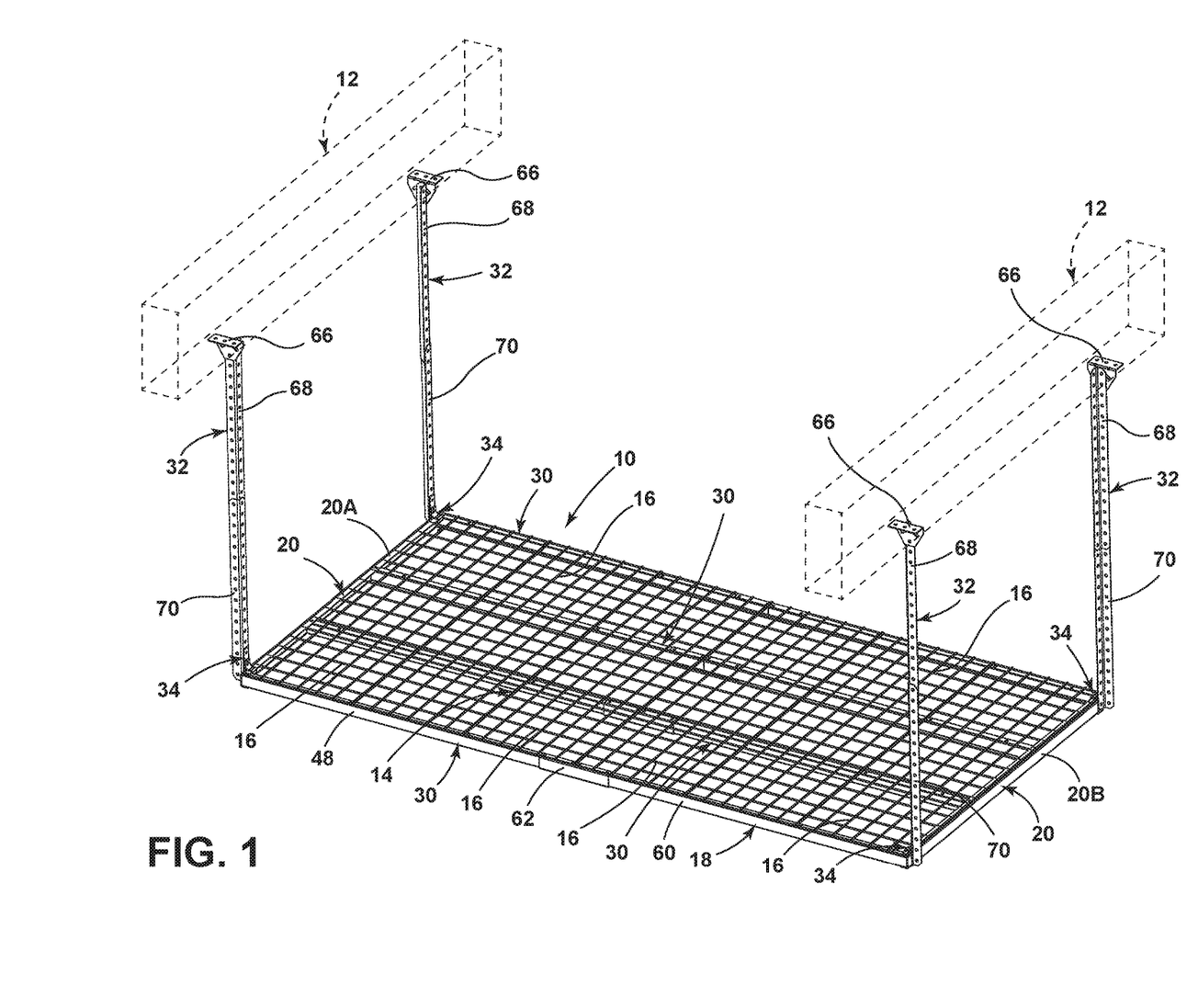
FIG. 1 is an upper perspective view of a storage shelf assembly, according to one embodiment.
Figure 2:
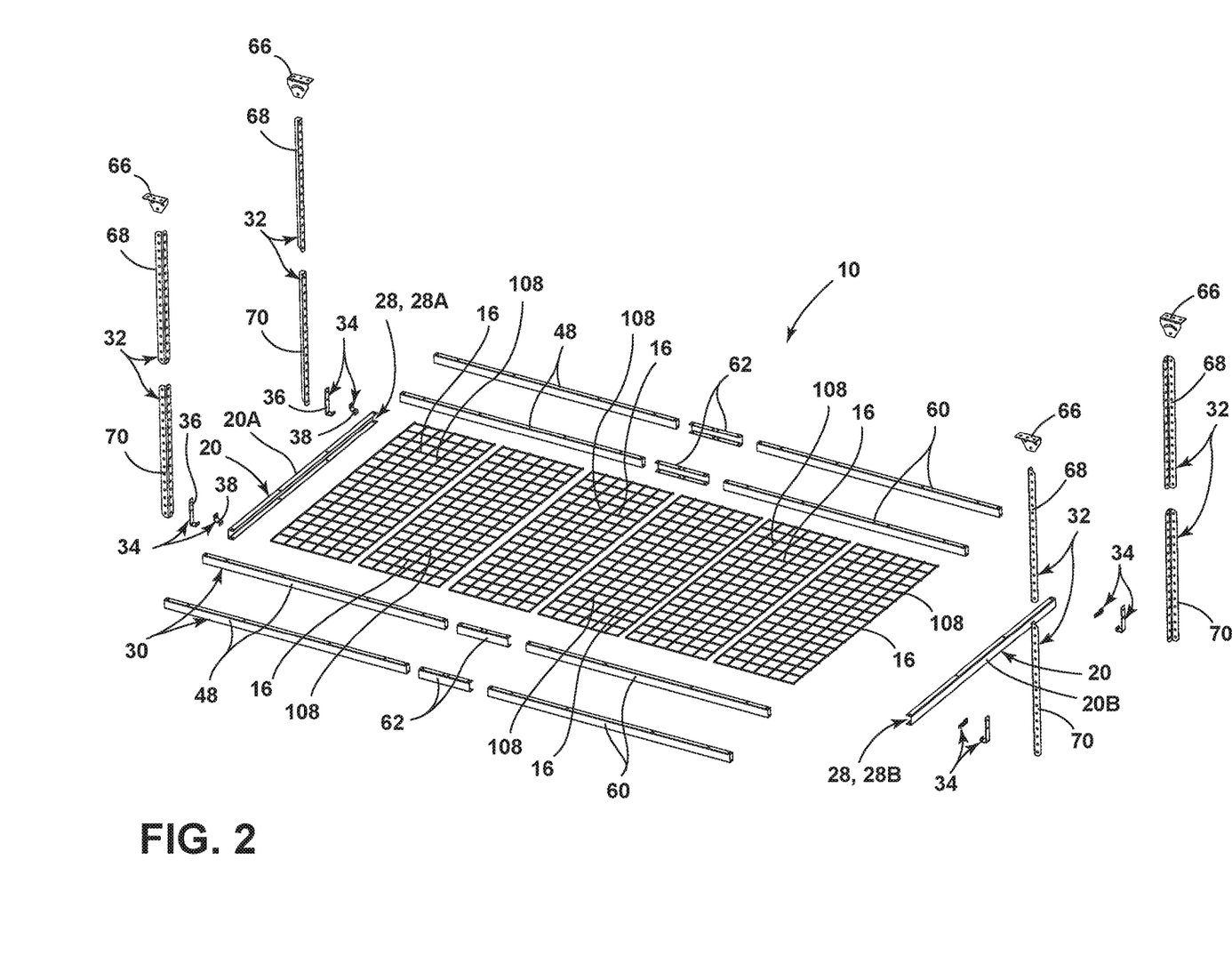
FIG. 2 is an exploded view of the storage shelf assembly of FIG. 1, according to one embodiment.
Figure 3:
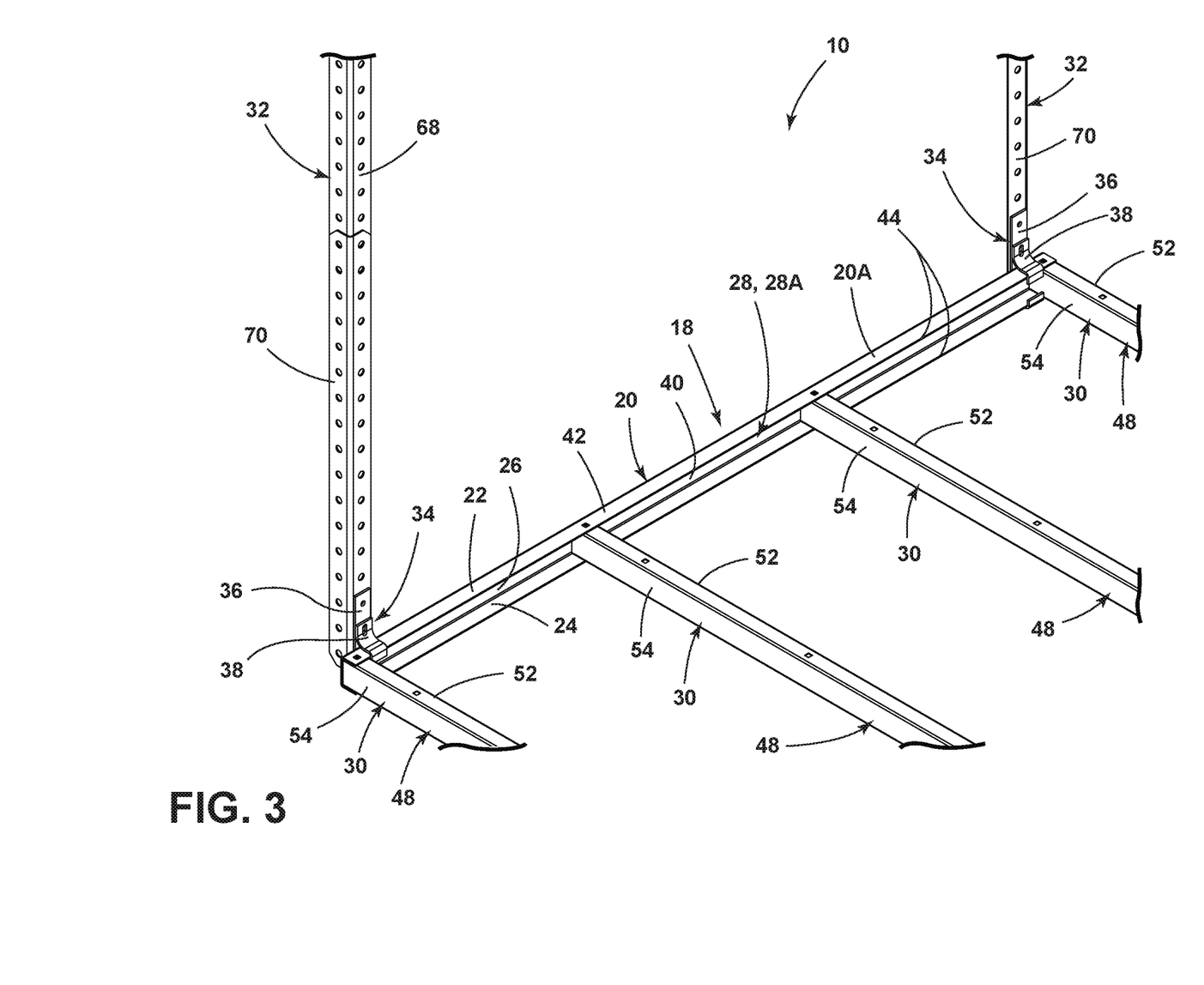
FIG. 3 is an upper perspective view of a portion of the storage shelf assembly, illustrating a portion of a platform support frame, according to one embodiment.

Referring now to FIGS. 1-3, the storage shelf assembly 10 includes the platform support frame 18. The platform support frame 18 includes a side member 20. The platform support frame 18 may include a plurality of side members 20. For example, as illustrated in FIGS. 1 and 2, the platform support frame 18 includes the first side member 20A and the second side member 20B. The side member 20 may include the upper wall 22, the lower wall 24 that is opposite the upper wall 22, and the connecting wall 26 that extends between the upper and lower walls 22, 24. The upper and lower walls 22, 24 may be generally parallel to each other and may be generally perpendicular to the connecting wall 26. The upper, lower, and connecting walls 22, 24, 26 define a channel 28 of the side member 20. The first side member 20A includes the first channel 28A and the second side member 20B includes the second channel 28B.

Figure 6A:
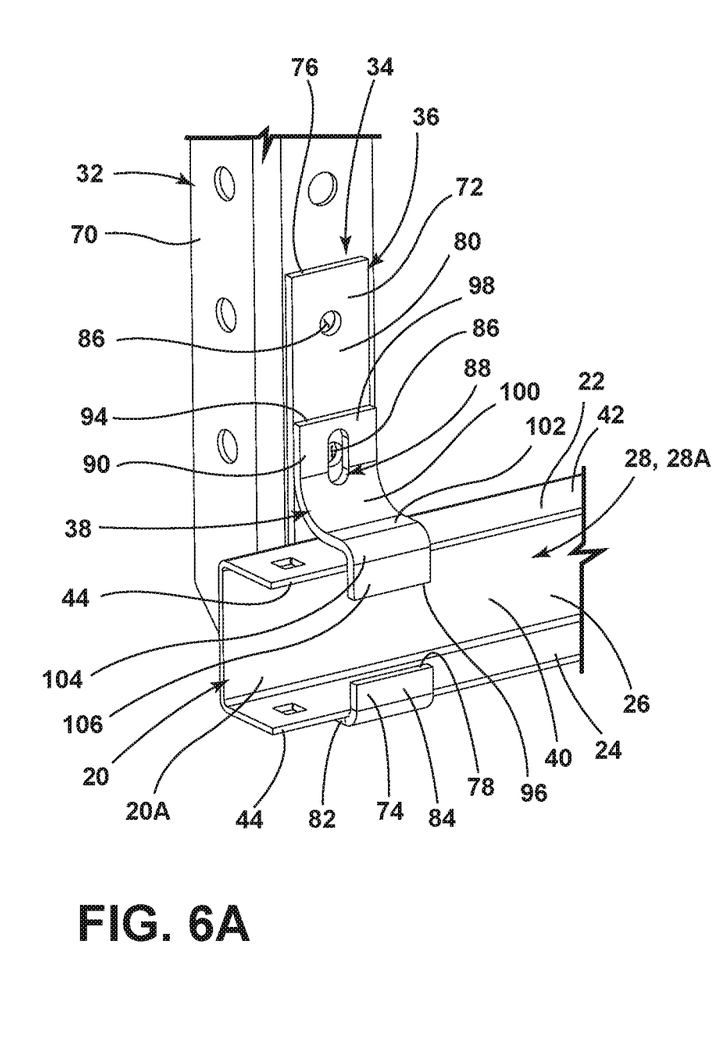
FIG. 6A is an upper perspective view of a portion of the storage shelf assembly, illustrating an attachment assembly coupling an upright to the platform support frame, according to one embodiment.
Figure 6B:
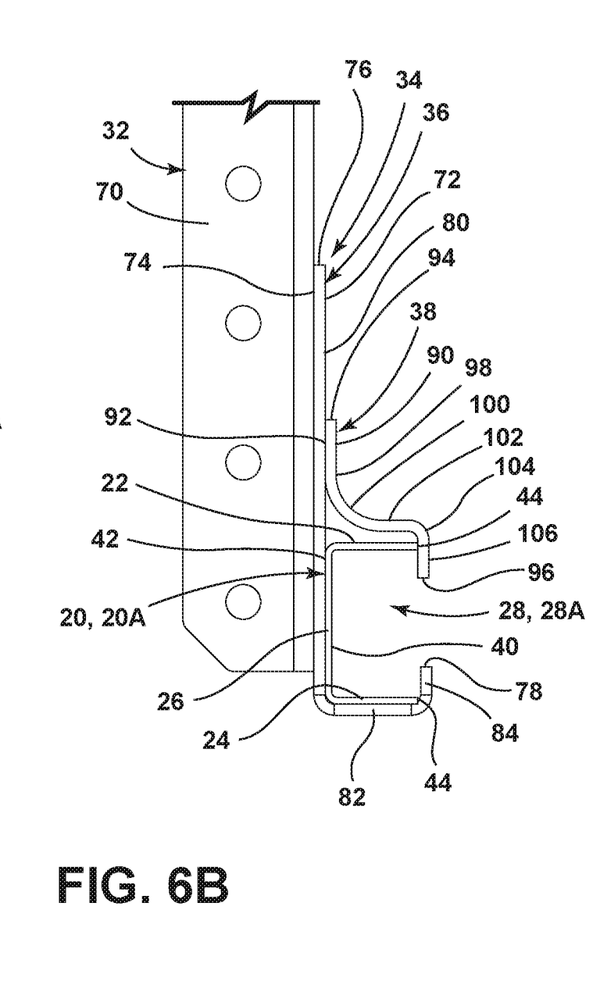
FIG. 6B is a side elevational view of the attachment assembly coupling the upright to a first side member of the platform support frame, according to one embodiment.

The side member 20 may include an interior side 40 and an exterior side 42 opposite the interior side 40. The interior side 40 may be the side of the side member 20 that defines the channel 28. The upper and lower walls 22, 24 of the side member 20 may include distal edges 44 that are positioned distally from the connecting wall 26. In other words, the upper and lower walls 22, 24 may extend from the connecting wall 26 to the distal edges 44 of the side member 20. As illustrated in FIG. 6B, the distal edges 44 of the upper and lower walls 22, 24 may extend between the interior and exterior sides 40, 42 of the side member 20.

Figure 7A:
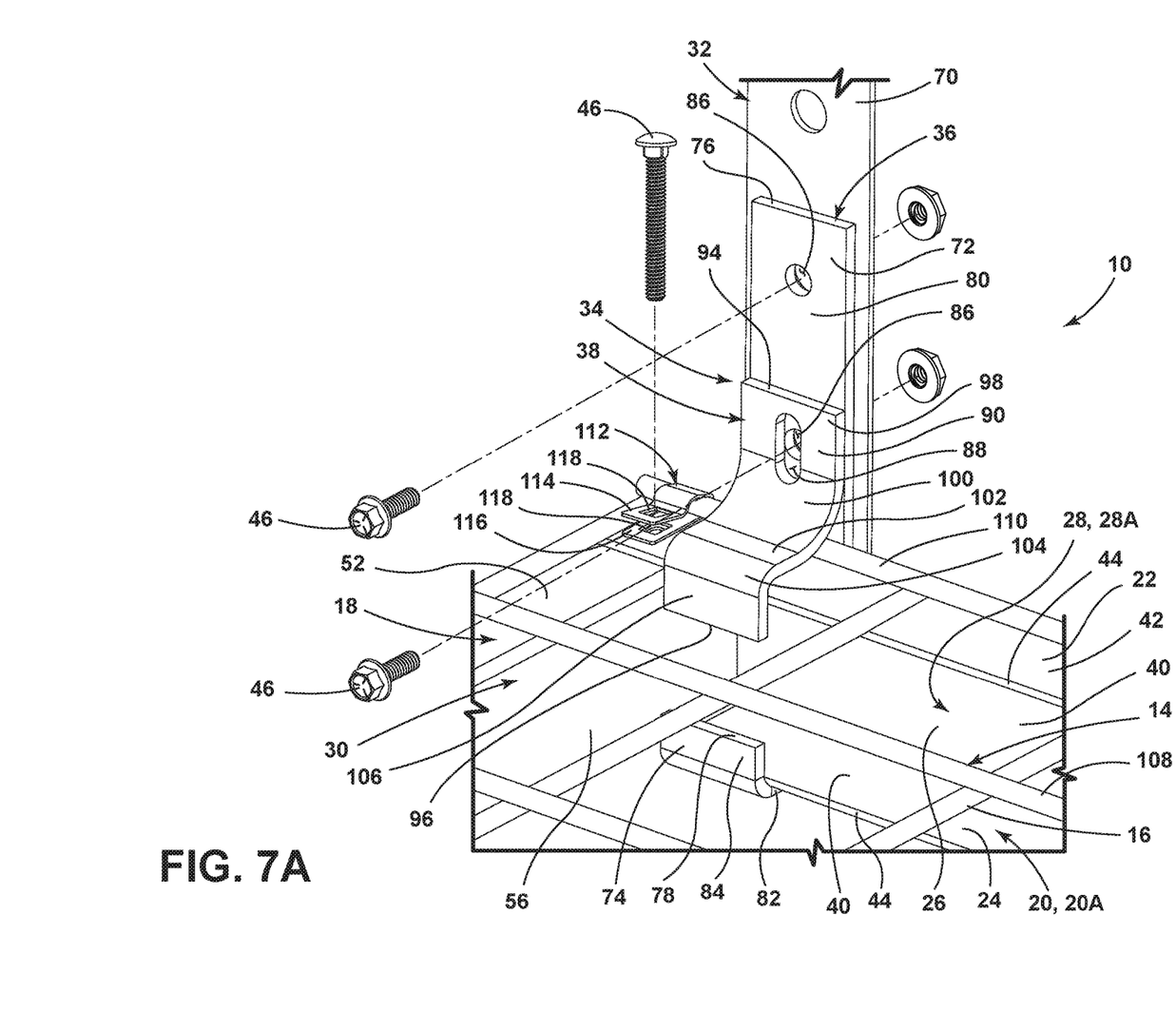
FIG. 7A is a perspective view of a portion of the storage shelf assembly, illustrating the platform support frame supporting a wire grid panel of a platform and the attachment assembly coupling the upright to the platform support frame, according to one embodiment.
Figure 7B:
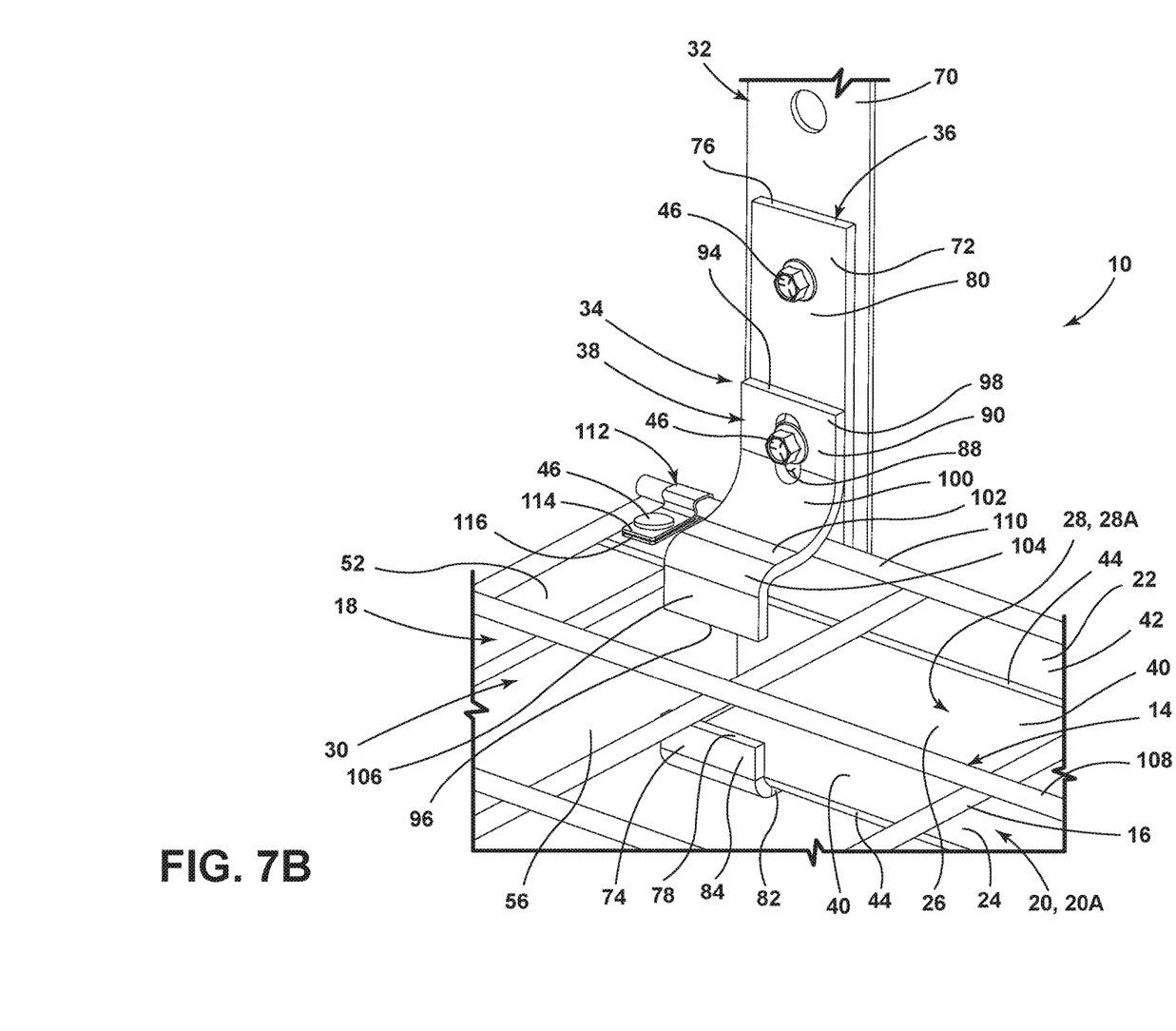
FIG. 7B is a perspective view of a portion of the storage shelf assembly, illustrating fasteners engaged with apertures of various portions of the storage shelf assembly to maintain the storage shelf assembly in an assembled condition.

As illustrated in FIG. 1, the second side member 20B is positioned opposite the first side member 20A, such that the second channel 28B generally faces the first channel 28A. In various embodiments, the side member 20 may define a plurality of apertures configured to receive fasteners 46 that are configured to couple the side member 20 to other components of the storage shelf assembly 10. For example, as illustrated in FIG. 6A, the upper and lower walls 22, 24 of the first side member 20A define apertures. The apertures of the side member 20 correspond with apertures defined by the plurality of cross members 30, as shown in FIG. 3, such that the cross members 30 may be coupled to the side member 20 by fasteners 46 in mating engagement with the aligned apertures of the cross members 30 and the side member 20, as shown in FIGS. 7A and 7B.

Referring now to FIGS. 1-5, the platform support frame 18 includes the cross member 30. In various embodiments, the platform support frame 18 includes a plurality of cross members 30. The cross member 30 may be coupled to and/or extend between the first and second side members 20A, 20B. The cross member 30 may be received within the first and second channels 28A, 28B of the first and second side members 20A, 20B, respectively, as illustrated in FIGS. 1-3. In other words, opposite end portions of the cross member 30 may extend into the first and second channels 28A, 28B, respectively. In the embodiment illustrated in FIG. 1, the platform support frame 18 includes four cross members 30, each of which is received within the first channel 28A of the first side member 20A, extends away from the first side member 20A to the second side member 20B, and is received within the second channel 28B of the second side member 20B.

In various embodiments, the cross member 30 may extend generally perpendicularly to the first and second side members 20A, 20B of the platform support frame 18. Further, in some implementations, the cross member 30 may be longer than the first side member 20A and/or the second side member 20B. For example, as illustrated in FIG. 1, the first side member 20A extends a first direction along a length of the first side member 20A, and at least one of the plurality of cross members 30 extends a second direction along a length of the at least one cross member 30, wherein the first and second directions are generally perpendicular to each other, and the length of the at least one cross member 30 is greater than the length of the first side member 20A. As described above herein, the cross member 30 may include a plurality of apertures, one or more of which may be configured to align with one or more apertures of the first and/or second side members 20A, 20B, as illustrated in FIG. 3.

Figures 4, 5:
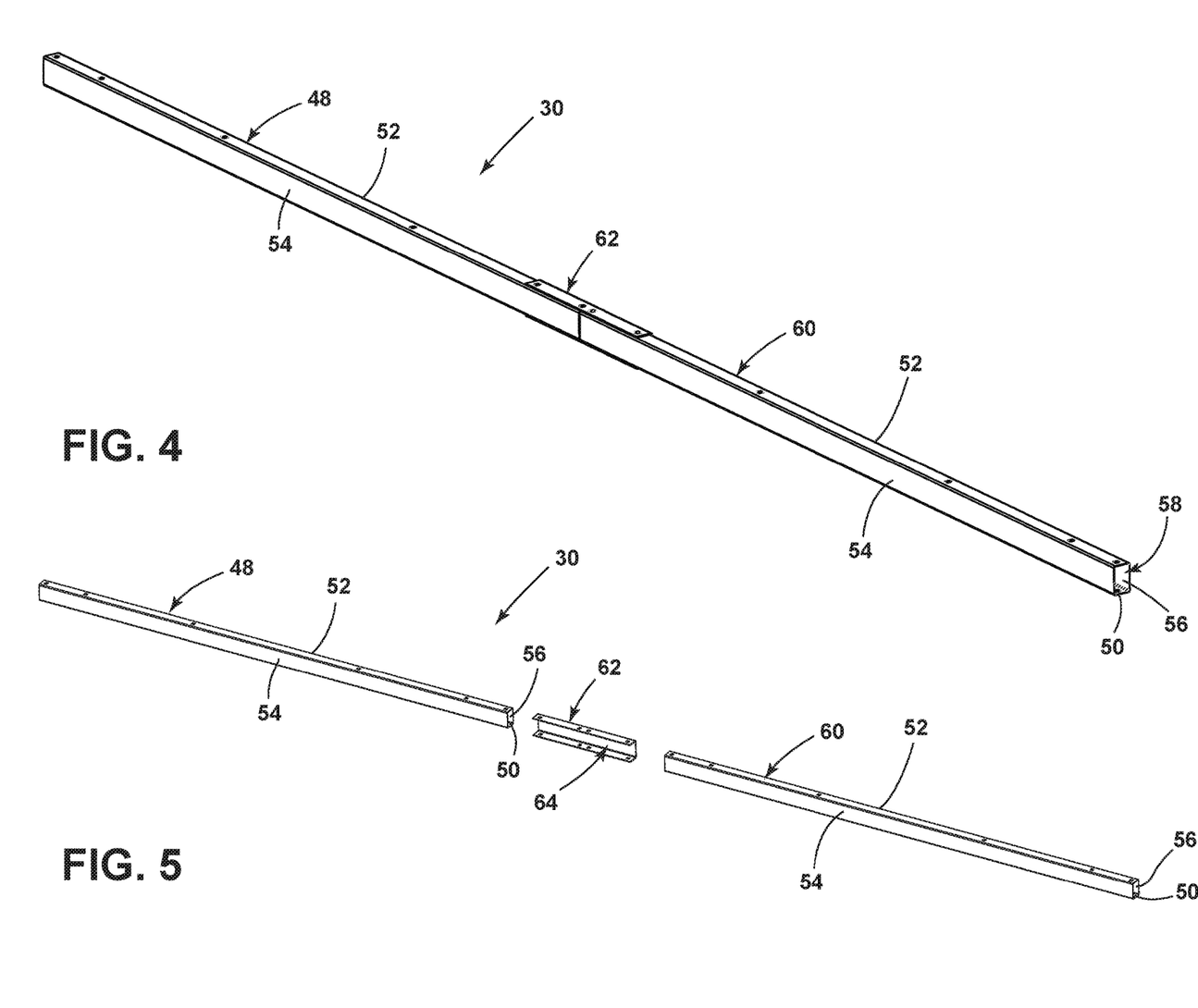
FIG. 4 is an upper perspective view of a cross member, illustrating a first rail, a second rail, and a bridge feature coupled to the first and second rails, according to one embodiment.
FIG. 5 is an exploded view of the cross member of FIG. 4, according to one embodiment.

Referring now to FIGS. 1-5, in some implementations, the cross member 30 may include a first rail 48. As illustrated in FIGS. 4 and 5, the first rail 48 may include a bottom wall 50, a top wall 52 that is opposite the bottom wall 50, a first side wall 54 that extends between the top and bottom walls 52, 50, and a second side wall 56 that extends between the top and bottom walls 52, 50 opposite the first side wall 54. The first and second side walls 54, 56 may be generally parallel to each other and may extend from the top wall 52 to the bottom wall 50 about a first distance. The top and bottom walls 52, 50 may be generally perpendicular to the first and second side walls 54, 56 and may extend from the first side wall 54 to the second side wall 56 about a second distance that is lesser than the first distance. In other words, the first rail 48 may have a non-square generally rectangular profile, wherein the top and bottom walls 52, 50 are the shorter sides and the first and second side walls 54, 56 are the longer sides of the rectangle, as shown in FIG. 4. The first rail 48 may be generally tubular and define a hollow 58 between the top wall 52, bottom wall 50, and first and second side walls 54, 56.

Referring now to FIG. 3, the first rail 48 may be received within the channel 28 of the side member 20. For example, as illustrated in FIG. 3, the first rail 48 is received within the first channel 28A defined by the first side member 20A, such that the top wall 52 of the first rail 48 is generally parallel to the upper wall 22 of the first side member 20A and the bottom wall 50 of the first rail 48 is generally parallel to the lower wall 24 of the first side member 20A. In various embodiments, the top wall 52 may contact the interior side 40 of the upper wall 22, and the bottom wall 50 may contact the interior side 40 of the lower wall 24, which may aid in retaining the first rail 48 in engagement with the first side member 20A. By orienting the first rail 48 in this taller-than-wide manner, the load bearing capacity of the first rail 48 may be optimized, which may increase the structural integrity of the storage shelf assembly 10.

As illustrated in FIG. 1, the first side member 20A may extend in a first direction along the length of the first side member 20A, and the first rail 48 may extend a second direction along a length of the first rail 48, wherein the first and second directions are generally perpendicular to each other. In some embodiments, the length of the first rail 48 may be greater than the length of the first side member 20A and/or the second side member 20B. In some embodiments, the length of the first rail 48 is about equal to the length of the first side member 20A and/or the second side member 20B. For example, the length of the first rail 48 and the length of the first side member 20A may be about 48 inches.

As illustrated in FIGS. 4 and 5, in some embodiments, the cross member 30 may include a second rail 60. In some examples, the second rail 60 may be about the same length as the first rail 48 and/or may generally have the same profile as the first rail 48. For example, in the embodiment illustrated in FIG. 5, the first and second rails 48, 60 both have lengths of about 48 inches and have generally rectangular profiles defined by the top, bottom, first side, and second side walls 52, 50, 54, 56 of the first and second rails 48, 60. As illustrated in FIG. 1, the second rail 60 may be received within the second channel 28B defined by the second side member 20B, such that the top wall 52 of the second rail 60 is generally parallel to the upper wall 22 of the second side member 20B and the bottom wall 50 of the second rail 60 is generally parallel to the lower wall 24 of the second side member 20B. The top and bottom walls 52, 50 of the second rail 60 may contact the interior sides 40 of the upper and lower walls 22, 24 of the second side member 20B, respectively, which may aid in retaining the cross member 30 in engagement with the second side member 20B.

As further illustrated in FIGS. 4 and 5, the cross member 30 may include a bridge feature 62. The bridge feature 62 may be coupled to the first and second rails 48, 60 and may be configured to rigidly connect the first and second rails 48, 60 to impart structural integrity to the cross member 30. In the embodiment illustrated in FIG. 5, the bridge feature 62 has a generally U-shaped profile and defines a bridge channel 64 that is configured to receive the first and second rails 48, 60. The bridge channel 64 may be configured to receive the top wall 52, the bottom wall 50, and at least one of the first and second side walls 54, 56 of the first and/or second rails 48, 60. Further, while received within the bridge channel 64, the top wall 52, the bottom wall 50, and one of the first and second side walls 54, 56 of the first and/or second rails 48, 60 may interface with the portion of the bridge feature 62 that defines the bridge channel 64. As illustrated in FIGS. 4 and 5, the bridge feature 62 may include a plurality of apertures configured to align with apertures defined by the first and second rails 48, 60. The aligned apertures may be configured to be engaged by corresponding fasteners (not shown) that rigidly couple the first and second rails 48, 60 to the bridge feature 62.

Referring now to FIGS. 1-3 and 6A-7B, the storage shelf assembly 10 includes the upright 32. As illustrated in FIG. 1, the storage shelf assembly 10 includes a plurality of uprights 32. The plurality of uprights 32 may be coupled to the platform support frame 18 and the structure 12, and may extend between the platform support frame 18 and the structure 12. For example, as illustrated in FIG. 1, each of the plurality of uprights 32 is coupled to the structure 12 via a mount bracket 66 and is coupled to the platform support frame 18 via the attachment assembly 34. The uprights 32 are configured to suspend the platform support frame 18 from the structure 12, as illustrated in FIG. 1.

In the embodiment illustrated in FIGS. 1 and 2, each of the plurality of uprights 32 includes a first upright member 68 and a second upright member 70. The first upright member 68 is coupled to the mount bracket 66, the second upright member 70 is coupled to the attachment assembly 34, and the first and second upright members 68, 70 are coupled to each other. As illustrated in FIG. 1, the first and second upright members 68, 70 are elongated with a generally L-shaped profile and define a plurality of apertures 38 that are distributed throughout the lengths of the first and second upright members 68, 70. The plurality of apertures are configured to receive fasteners 46 that couple the first and/or second upright members 68, 70 to the mount bracket 66, the attachment assembly 34, and/or each other. Further, the L-shaped profiles of the first and second upright members 68, 70 allow the first and second upright members 68, 70 to nest, which may increase the structural integrity of the uprights 32 and, thus, the storage shelf assembly 10. The first and second upright members 68, 70 may be coupled to each other via fasteners (not shown) that matingly engage aligned apertures of the first and second upright members 68, 70. The lengths of the uprights 32 may vary based on which apertures of the first and second upright members 68, 70 are aligned and engaged by the fasteners. Thus, the length of the uprights 32 may be conveniently adjusted to suit the needs of a user. A variety of types of uprights 32 configured to suspend the platform support frame 18 from the structure 12 are contemplated.

Referring now to FIGS. 3 and 6A-7B, the attachment assembly 34 is configured to couple the upright 32 to the platform support frame 18. The attachment assembly 34 may include the support bracket 36 and the clamp feature 38. The support bracket 36 may be coupled to the upright 32 and may be configured to cradle the lower wall 24 of the first side member 20A. The support bracket 36 includes a first side 72 and a second side 74 opposite the first side 72. The support bracket 36 extends from a first end 76 positioned between the first and second sides 72, 74 to a second end 78 positioned between the first and second sides 72, 74. As illustrated in FIG. 6B, the first side 72 of the support bracket 36 cradles the lower wall 24 of the first side member 20A, and the second side 74 of the support bracket 36 is coupled to the upright 32.

In the embodiment illustrated in FIGS. 6A-7B, the support bracket 36 includes a shank 80, a floor 82, and a tang 84. The shank 80 extends from the first end 76 to the floor 82. When the storage shelf assembly 10 is assembled and suspended from the structure 12, the first end 76 of the support bracket 36 is nearer than the floor 82 of the support bracket 36 to the structure 12. Further, the side member 20 and the clamp feature 38 are positioned generally between the floor 82 and the first end 76 of the support bracket 36. As illustrated in FIG. 6B, the shank 80 of the support bracket 36 extends downward from the first end 76 along the upright 32 to the floor 82, such that the second side 74 of the shank 80 contacts the upright 32. A portion of the shank 80 is positioned between the upright 32 and the connecting wall 26 of the first side member 20A, such that the second side 74 of the shank 80 contacts the upright 32 and the first side of the shank 80 contacts the exterior side 42 of the connecting wall 26 of the first side member 20A.

In various implementations, the shank 80 defines at least one support bracket aperture 86 that corresponds with at least one of the apertures defined by the upright 32 and an elongated aperture 88 defined by the clamp feature 38, as described further herein. In the embodiment illustrated in FIGS. 6A and 7A, the shank 80 defines two support bracket apertures 86, one of which is configured to correspond with one of the apertures of the upright 32, and the other of which is configured to correspond with another aperture of the upright 32 and the elongated aperture 88 defined by the clamp feature 38. The at least one support bracket aperture 86 defined by the shank 80 of the support bracket 36 is configured to receive at least one fastener 46 that couples the support bracket 36 to the upright 32 and/or the clamp feature 38, as illustrated in FIGS. 7A and 7B.

Referring still to FIGS. 6A-7B, the floor 82 of the support bracket 36 is coupled to the shank 80 and extends away from the upright 32 coupled to the shank 80. The floor 82 extends along the lower wall 24 of the first side member 20A. As illustrated in FIG. 6B, the first side of the floor 82 of the support bracket 36 may contact the exterior side 42 of the lower wall 24 that is opposite the first channel 28A of the first side member 20A to support the first side member 20A. In the illustrated embodiment, the floor 82 extends outward generally perpendicularly from the shank 80.

The tang 84 of the support bracket 36 is coupled to the floor 82 at a distal end of the floor 82 relative to the shank 80. The tang 84 extends upward from the floor 82 to the second end 78 of the support bracket 36. As illustrated in FIGS. 6A and 6B, the tang 84 extends upward from the floor 82 generally toward the clamp feature 38, as described further herein. In some implementations, the tang 84 and the shank 80 may be generally parallel to each other. As illustrated in FIG. 6B, the first side of the shank 80 may contact the exterior side 42 of the connecting wall 26 of the first side member 20A, the first side of the floor 82 may contact the exterior side 42 of the lower wall 24, and/or the first side of the tang 84 may contact the distal edge of the lower wall 24, such that the support bracket 36 generally cradles the first side member 20A.

Referring still to FIGS. 6A-7B, the attachment assembly 34 includes the clamp feature 38. The clamp feature 38 may be coupled to the support bracket 36 opposite the at least one upright 32, such that the support bracket 36 is positioned between the clamp feature 38 and the at least one upright 32. In other words, the clamp feature 38 may be coupled to the first side 72 of the support bracket 36. The clamp feature 38 may extend from the support bracket 36 over the upper wall 22 of the first side member 20A. In the embodiment illustrated in FIGS. 6A-7B, the clamp feature 38 includes a first side 90, a second side 92 opposite the first side 90, an upper edge 94 between the first and second sides 90, 92, and a lower edge 96 between the first and second sides 90, 92 opposite the upper edge 94. A first portion 98 extends downward from the upper edge 94 to a first corner 100, a second portion 102 extends outward from the first corner 100 to a second corner 104, and a third portion 106 extends downward from the second corner 104 to the lower edge 96. As illustrated in FIGS. 6A-7B, the first and second corners 100, 104 are generally arcuate. The first portion 98 is generally perpendicular to the second portion 102 and is generally parallel to the third portion 106. The first portion 98 is coupled to the shank 80 of the support bracket 36 and extends along the shank 80 toward the floor 82 before reaching the first corner 100.

As illustrated in FIGS. 6A-7B, when the attachment assembly 34 is assembled to couple the side member 20 to upright 32, the second side 92 of the first portion 98 of the clamp feature 38 is in contact with the first side of the shank 80, and the second portion 102 extends over the upper wall 22 of the first side member 20A. In the illustrated embodiment, the second portion 102 and the upper wall 22 of the first side member 20A are in a spaced relationship with each other. In other words, a gap exists between the second side 92 of the second portion 102 of the clamp feature 38 and the exterior side 42 of the upper wall 22 of the first side member 20A. The spaced relationship between the second portion 102 and the upper wall 22 may allow for a portion of the at least one panel 16 of the platform 14 to extend between the clamp feature 38 and the side member 20, as described further herein. It is contemplated that, in some embodiments, the second portion 102 and the upper wall 22 may be in contact with each other. As shown in FIG. 6B, the second side 92 of the third portion 106 of the clamp feature 38 contacts the distal edge of the upper wall 22 of the first side member 20A. Thus, the first side member 20A is cradled by the support bracket 36 and is clamped between the shank 80 of the support bracket 36 and the third portion 106 of the clamp feature 38. This multi-directional engagement of the first side member 20A by the attachment assembly 34 may aid in rigidly coupling the upright 32 to the platform support frame 18. As illustrated in FIGS. 6A and 6B, the third portion 106 of the clamp feature 38 and the tang 84 of the support bracket 36 may extend toward each other and/or be generally parallel to each other. Additionally, the second end 78 of the support bracket 36 may face the lower edge 96 of the clamp feature 38.

As illustrated in FIG. 6A, the clamp feature 38 defines the elongated aperture 88 that extends through the first portion 98 of the clamp feature 38. The elongated aperture 88 aligns with at least one support bracket aperture 86 defined by the shank 80 and the aperture defined by the upright 32, such that the fastener 46 may extend through the aligned apertures to couple the support bracket 36 to the upright 32 and the clamp feature 38 to the support bracket 36, as illustrated in FIGS. 7A and 7B. The elongated nature of the elongated aperture 88 may account for play in the storage shelf assembly 10, which may increase the ease of assembly of the storage shelf assembly 10.

Referring now to FIGS. 1, 2, 7A, and 7B, the platform 14 is configured to be supported by the platform support frame 18. In various implementations, the platform 14 includes at least one panel 16 that is configured to be supported by the platform support frame 18. In the embodiment illustrated in FIGS. 1 and 2, the platform 14 includes a plurality of panels 16. At least one of the plurality of panels 16 may extend in a lengthwise direction that is generally parallel to the first and second side members 20A, 20B for a first distance, and may extend in a widthwise direction that is generally parallel to at least one of the plurality of cross members 30 a second distance, wherein the first distance is greater than the second distance. In various embodiments, the platform 14 may include a plurality of types of panels 16 (e.g., solid, grid, etc.). Further, in various implementations, the at least one panel 16 may be formed of a variety of materials (e.g., metal, wood, plastic, etc.). In some embodiments, the platform 14 may include at least one wire grid panel 108 that is made of a plurality of wires 110 that are welded together to form a grid. For example, in the embodiment illustrated in FIGS. 1 and 2, the platform 14 includes six, individual wire grid panels 108 that extend lengthwise parallel to the first and second side members 20A, 20B and widthwise parallel to the plurality of cross members 30. In some embodiments, at least one of the plurality of panels 16 may be supported by and configured to contact each of the four cross members 30 of the platform support frame 18, as illustrated in FIG. 1.

Referring now to FIGS. 7A and 7B, in some embodiments, at least a portion of the at least one panel 16 of the platform 14 may be positioned between the clamp feature 38 and the upper wall 22 of the first side member 20A. For example, as illustrated in FIGS. 7A and 7B, one of the wires 110 of the wire grid panel 108 that extends parallel to the first side member 20A is positioned between the second side 92 of the clamp feature 38 and the exterior side 42 of the upper wall 22 of the first side member 20A. The wire 110 may be generally clamped between the second side 92 of the clamp feature 38 and the exterior side 42 of the upper wall 22, which may aid in securing at least one panel 16 of the platform 14 to the platform support frame 18.

In various implementations, the panels 16 of the platform 14 may additionally or alternatively be coupled to platform support frame 18 in a variety of other ways and/or by a variety of other features. For example, as illustrated in FIGS. 7A and 7B, a retention clip 112 wraps about the wire 110 of the wire grid panel 108 and includes upper and lower tabs 114, 116 that define recesses 118. The recesses 118 align with apertures defined by the first side member 20A and the cross member 30, such that the fastener 46 may matingly engage the aligned recesses 118 and apertures to both couple the cross member 30 to the first side member 20A and secure the wire grid panel 108 to the platform support frame 18, as illustrated in FIG. 7B. In various implementations, the plurality of panels 16 of the platform 14 may be coupled to the platform support frame 18 via a plurality of the retention clips 112.

Various aspects of the present disclosure may provide a variety of advantages. First, forming the cross members 30 out of first and second generally rectangular, tubular rails 48, 60, and orienting the first and second rails 48, 60 with the top and bottom walls 52, 50 interfacing with the upper and lower walls 22, 24 of the first and second side members 20A, 20B, respectively, may allow the cross members 30 to maintain their shape better while using less material than conventional open, formed channel rails. Second, utilizing the bridge feature 62 to make a structurally sound cross member 30 out of the relatively shorter first and second rails 48, 60 may increase the convenience of shipping the unassembled storage shelf assembly 10 by reducing the size of the necessary packaging. Third, running the plurality of panels 16 in a lengthwise direction perpendicular to, and extending over, each of the cross members 30 may advantageously reduce the necessary packaging size and avoids the need for cross braces running perpendicular to the cross members 30 between the first and second side members 20A, 20B. Fourth, the support bracket 36 including the tang 84 extending upward from the floor 82 may aid in securely supporting the side members 20 of the platform 14 during and after assembly of the storage shelf assembly 10. Fifth, the clamp feature 38 having a first corner 100 and/or a second corner 104 that is generally arcuate may provide greater clamping pressure and use less material than a clamp with non-arcuate first and second corners.

It will be understood by one having ordinary skill in the art that construction of the present disclosure and other components is not limited to any specific material. Other exemplary embodiments of the disclosure disclosed herein may be formed from a wide variety of materials, unless described otherwise herein.

It is also to be understood that variations and modifications can be made on the aforementioned structures without departing from the concepts of the present invention, and further it is to be understood that such concepts are intended to be covered by the following claims unless these claims by their language expressly state otherwise.

What is claimed is:

1. A storage shelf assembly for suspending from a structure, comprising:
   a platform comprising at least one panel;
   a platform support frame comprising:
      a first side member having an upper wall, a lower wall opposite the upper wall, and a connecting wall extending between the upper and lower walls to define a first channel;
      a second side member having an upper wall, a lower wall opposite the upper wall, and a connecting wall extending between the upper and lower walls to define a second channel, wherein the second side member is positioned opposite the first side member, such that the second channel generally faces the first channel; and
      a plurality of cross members that extend between the first and second side members and are received within the first and second channels, wherein the at least one panel is configured to be supported by the plurality of cross members;
   a plurality of uprights coupled to the platform support frame and the structure and configured to suspend the platform support frame from the structure, wherein at least one of the plurality of uprights is coupled to the first side member of the platform support frame via an attachment assembly, comprising:
      a support bracket coupled to the at least one upright and configured to cradle the lower wall of the first side member; and
      a clamp feature coupled to the support bracket opposite the at least one upright, such that the support bracket is positioned between the clamp feature and the at least one upright, wherein the clamp feature extends from the support bracket over the upper wall of the first side member; and
   wherein, the support bracket comprises:
      a shank that extends between the at least one upright and the connecting wall of the first side member;
      a floor coupled to the shank and extending away from the at least one upright along the lower wall of the first side member;
      a tang coupled to the floor and extending generally toward the clamp feature; and
   wherein the clamp feature comprises:
      a first portion coupled to the shank of the support bracket and extending along the shank;
      a second portion coupled to the first portion and extending away from the shank over the upper wall of the first side member; and
      a third portion coupled to the second portion and extending generally toward the tang of the support bracket, wherein the third portion is configured to contact a distal edge of the upper wall of the first side member.

2. The storage shelf assembly of claim 1, wherein the first portion is coupled to the second portion by a generally arcuate first corner.

3. The storage shelf assembly of claim 2, wherein the first portion is generally perpendicular to the second portion and generally parallel to the third portion.

4. The storage shelf assembly of claim 3, wherein the second portion is in a spaced relationship with the upper wall of the first side member.

5. The storage shelf assembly of claim 1, wherein the at least one panel of the platform extends in a lengthwise direction generally parallel to the first and second side members a first distance, and the at least one panel extends in a widthwise direction generally parallel to at least one of the plurality of cross members a second distance, wherein the first distance is greater than the second distance.

6. The storage shelf assembly of claim 5, wherein the first side member extends a first direction along a length of the first side member, and the at least one cross member extends a second direction along a length of the at least one cross member, wherein the first and second directions are generally perpendicular to each other, and the length of the at least one cross member is greater than the length of the first side member.

7. The storage shelf assembly of claim 1, wherein at least one of the plurality of cross members comprises:
   a first rail having a bottom wall, a top wall opposite the bottom wall, a first side wall extending between the top and bottom walls, and a second side wall extending between the top and bottom walls opposite the first side wall, wherein the first and second side walls are generally parallel to each other and extend from the top wall to the bottom wall about a first distance, the top and bottom walls are generally perpendicular to the first and second side walls and extend from the first side wall to the second side wall about a second distance that is lesser than the first distance, and wherein the first rail is received within the first channel defined by the first side member, such that the top wall is generally parallel to the upper wall and the bottom wall is generally parallel to the lower wall.

8. The storage shelf assembly of claim 7, wherein the at least one of the plurality of cross members further comprises:
   a second rail configured to be received within the second channel of the second side member; and
   a bridge feature coupled to the first and second side members.

9. The storage shelf assembly of claim 1, wherein the plurality of cross members comprises four cross members, wherein the at least one panel contacts each of the four cross members.

10. The storage shelf assembly of claim 1, wherein the plurality of panels comprises six wire grid panels.

* * * * *